United States Patent
Zhang et al.

(10) Patent No.: US 9,255,531 B2
(45) Date of Patent: Feb. 9, 2016

(54) MULTI FUEL ENGINE SUBSTITUTION OPTIMIZATION FOR TRANSIENT PERFORMANCE

(71) Applicant: Caterpillar Inc., Peoria, IL (US)

(72) Inventors: Yanchai Zhang, Dunlap, IL (US); Mallikharjuna R. Boddu, Peoria, IL (US); Evan E. Jacobson, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 76 days.

(21) Appl. No.: 14/181,133

(22) Filed: Feb. 14, 2014

(65) Prior Publication Data

US 2015/0233310 A1   Aug. 20, 2015

(51) Int. Cl.
*F02D 19/06* (2006.01)
*B60W 10/10* (2012.01)
*B60W 10/06* (2006.01)
*F16H 59/66* (2006.01)

(52) U.S. Cl.
CPC ............... *F02D 19/06* (2013.01); *B60W 10/06* (2013.01); *B60W 10/10* (2013.01); *F02D 19/0639* (2013.01); *F16H 2059/666* (2013.01)

(58) Field of Classification Search
CPC ............. F02D 19/06; F02D 19/0639; F16H 2059/6669; F16H 2059/666
See application file for complete search history.

(56) References Cited

U.S. PATENT DOCUMENTS

| | | | |
|---|---|---|---|
| 5,716,301 A * | 2/1998 | Wild et al. | 477/97 |
| 5,832,400 A * | 11/1998 | Takahashi et al. | 701/53 |
| 5,931,886 A * | 8/1999 | Moroto et al. | 701/54 |
| 7,949,452 B2 | 5/2011 | Eriksson et al. | |
| 8,006,677 B2 | 8/2011 | Williams et al. | |
| 8,099,220 B2 | 1/2012 | Kim et al. | |
| 2011/0264358 A1 | 10/2011 | Nishida | |
| 2011/0301794 A1 | 12/2011 | Bastien | |
| 2013/0158752 A1 | 6/2013 | Norton | |
| 2013/0230376 A1 | 9/2013 | Soma' et al. | |

\* cited by examiner

*Primary Examiner* — Ramya Burgess
*Assistant Examiner* — David Morris
(74) *Attorney, Agent, or Firm* — Miller, Matthias & Hull LLP

(57) ABSTRACT

In an engine system of a machine having a multi fuel engine system, the occurrence of transient events such as gear shifts, grade changes and machine speed changes may be anticipated, and a fuel substitution strategy may be adjusted if necessary to optimize performance during the transient events. Transient events at a worksite may be anticipated and mapped by evaluating shift control logic strategies and worksite maps with truck route, speed and topographical information and determining where the fuel substitution strategy cannot meet the power requirements for the transient event. When it is determined that the machine is approaching an anticipated transient event, an appropriate fuel substitution adjustment can be executed to ensure the engine has sufficient power for the transient event.

20 Claims, 5 Drawing Sheets

MULTI FUEL ENGINE SUBSTITUTION OPTIMIZATION FOR TRANSIENT PERFORMANCE

TECHNICAL FIELD

The present disclosure relates generally to multi fuel engines capable of operating with liquid fuel, with gaseous fuel and with a mixture of liquid and gaseous fuels, and more particularly, to methods and systems for optimizing the substitution of the liquid and gaseous fuels in multi fuel engines to improve performance during anticipated transient events.

BACKGROUND

A multi fuel engine refers generically to any type of engine, boiler, heater or other fuel-burning device which is designed to burn multiple types of fuels in its operation. Multi fuel engines have application in diverse areas to meet particular operational needs in the operating environment. For example, a common use of multi fuel engines is in military vehicles so that vehicles in various deployment locations may run a wide range of alternative fuels such as gasoline, diesel or aviation fuel. In combat settings, for example, enemy action or unit isolation may limit the available fuel supply and personnel may need to resort the type of fuel available for usage from enemy and civilian sources. Multi fuel engines are also desirable where cheaper fuel sources, such as natural gas, are available, but an alternative or secondary fuel, such as diesel fuel, is needed for performance reasons (e.g., faster reaction to short term load demand), as a backup in the event of an interruption in the supply of the primary fuel source, or for other operational or engine performance conditions.

A multi fuel engine typically operates with a specified mixture of the available fuels. Where a liquid-only fuel mixture is specified, a liquid fuel, such as diesel fuel, gasoline or other liquid hydrocarbon fuel, is injected directly into an engine cylinder or a pre-combustion chamber as the sole source of energy during combustion. When a liquid and gaseous fuel mixture is specified, a gaseous fuel, such as natural gas, methane, hexane, pentane or any other appropriate gaseous hydrocarbon fuel, may be mixed with air in an intake port of a cylinder and a small amount or pilot amount of liquid fuel, such as diesel fuel, is injected into the cylinder or the pre-combustion chamber in an amount according to a specified substitution ratio in order to ignite the mixture of air and gaseous fuel.

Machines having multi fuel engines are configured with fuel substitution strategies that control the mixture of liquid and gaseous fuels to provide the necessary power for the engine during operation of the machine. For example, a fuel substitution strategy may specify a mixture of 80% gaseous fuel and 20% liquid fuel during normal operations. At times, the fuel substitution strategy may adjust the substitution ratio to increase the percentage of liquid fuel or gaseous fuel as necessary to meet short term deviations in the power requirements for the engine, known as transient events, such as when the load on the engine or the speed of the machine increases or decreases. In current fuel substitution strategies, the machines react to the occurrence of the transient events, and therefore lag in responding to the transient events with resulting degradation of performance. For example, when an automatic transmission up shifts to a higher gear according to shift control logic programmed into the machine, the engine experiences a transient event in the form of an increase in torque after the up shift occurs. A substitution ratio that is too rich in gaseous fuel that requires an increase in the intake air to maintain an air fuel ratio (AFR) may experience a power loss during and after the transition to the higher gear until the intake air catches up to the new fuel demand or the substitution ratio adjusts to a mixture that is richer in the liquid fuel. In view of this, a need exists for improved control over fuel substitution ratios when encountering various operating conditions that may cause transient events that can be anticipated.

SUMMARY OF THE DISCLOSURE

In one aspect of the present disclosure, a method for mapping transient events for a machine operating at a worksite is disclosed. The method may include determining at an electronic control module associated with the machine a transmission gear shift schedule for the machine based on a shift control logic strategy for the machine and worksite map information for the worksite in which the machine will operate, storing gear shift transient event coordinates for gear shift transient events identified in the transmission gear shift schedule in a memory associated with the machine, and retrieving from the memory a first fuel substitution strategy for providing a mixture of available fuels to a multi fuel engine of the machine. The method may further include comparing the gear shift transient events to the first fuel substitution strategy, for each gear shift transient event, determining whether a gear shift fuel substitution adjustment to the first fuel substitution strategy is required based on the comparison of the gear shift transient event to the first fuel substitution strategy, and storing the fuel substitution adjustments in the memory.

In another aspect of the present disclosure, a multi fuel engine system for a machine is disclosed. The multi fuel engine system may include a multi fuel engine, an engine speed control configured to output an engine speed control signal indicating a desired engine speed for the machine, a plurality of actuators, wherein each of the plurality of actuators corresponds to a fluid flow control device for one of a plurality of fuels that are available for providing power to the multi fuel engine by causing a flow of the corresponding one of the plurality of fuels to the multi fuel engine, a memory associated with the machine, and an electronic control module operatively connected to the engine speed control, the plurality of actuators and the memory. The electronic control module may be configured to determine a transmission gear shift schedule for the machine based on a shift control logic strategy for the machine and worksite map information for a worksite in which the machine will operate stored in the memory, to store in the memory gear shift transient event coordinates for gear shift transient events identified in the transmission gear shift schedule, and to retrieve from the memory a first fuel substitution strategy for providing a mixture of available fuels to the multi fuel engine via the fluid flow control devices. The electronic control module may further be configured to compare the gear shift transient events to the first fuel substitution strategy, to determine, for each gear shift transient event, whether a gear shift fuel substitution adjustment to the first fuel substitution strategy is required based on the comparison of the gear shift transient event to the first fuel substitution strategy, and to store the fuel substitution adjustments in the memory.

In a further aspect of the present disclosure, a method for operating a machine having a multi fuel engine at a worksite is disclosed. The method may include operating the machine at the worksite under control of a electronic control module associated with the machine and according to a fuel substitution strategy stored in a memory associated with the machine for providing a plurality of available fuels to the multi fuel engine of the machine, determining at the electronic control module whether the machine is approaching an anticipated transient event, and determining at the electronic control module current machine operating conditions in response to determining that the machine is approaching an anticipated transient event. The method may further include determining at the electronic control module whether the anticipated transient event will occur based on the current machine operating conditions, and executing a fuel substitution adjustment to the fuel substitution strategy in response to determining that the anticipated transient event will occur.

Additional aspects are defined by the claims of this patent.

DETAILED DESCRIPTION

Although the following text sets forth a detailed description of numerous different embodiments of the present disclosure, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112(f).

Figure 1:
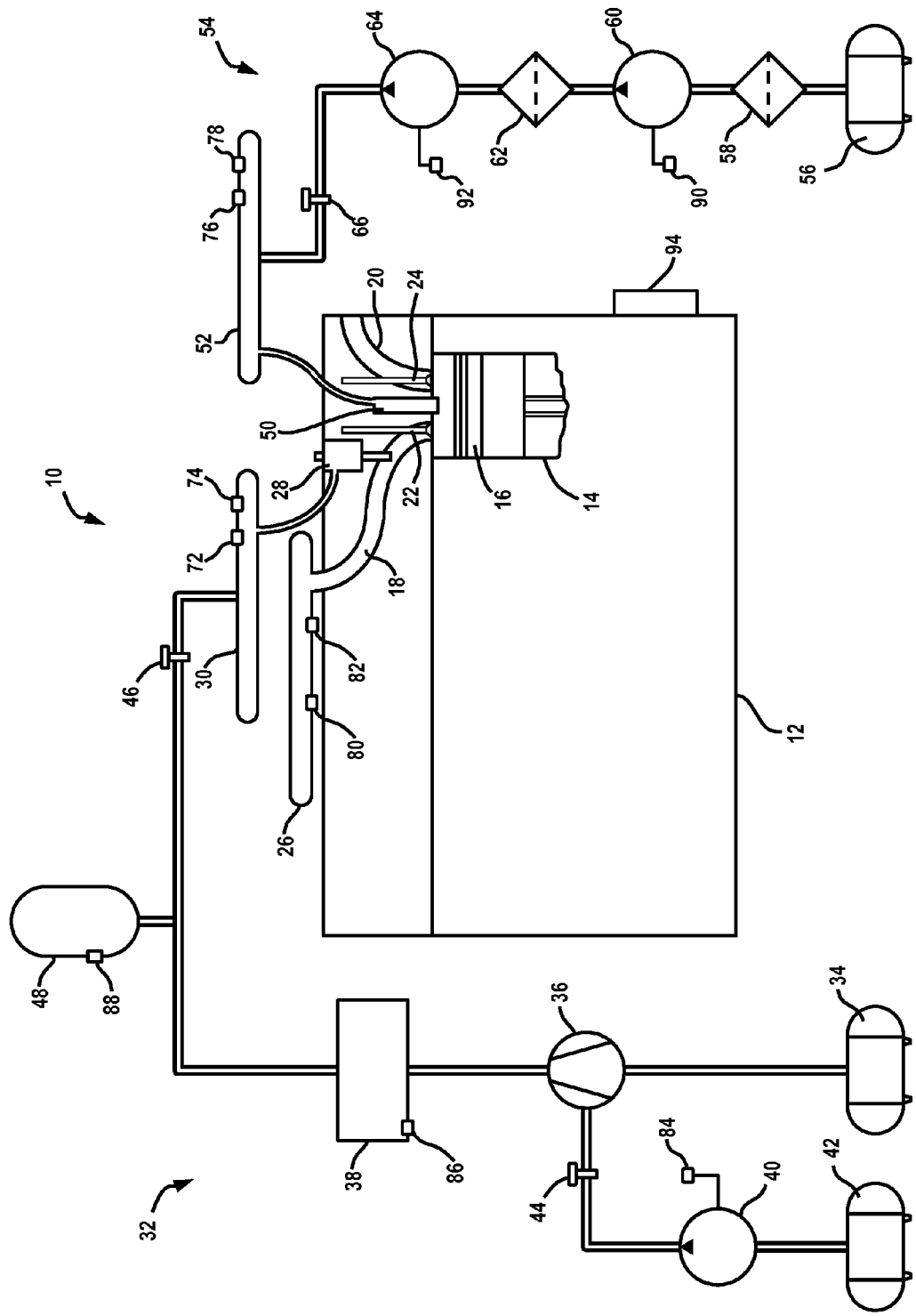
FIG. 1 is a schematic view of an exemplary multi fuel engine system in accordance with the present disclosure.

Referring to the drawings, FIG. 1 depicts an exemplary multi fuel engine system 10 that may include an engine 12 with a representative cylinder 14 of a plurality of cylinders 14 implemented in the engine 12. Although only one cylinder 14 is shown, it is recognized that the actual number of cylinders 14 of the engine 12 could vary and that the engine 12 could be of the in-line type, V-type, or even a rotary type engine. A piston 16 is positioned for displacement within the cylinder 14, and the cylinder 14 includes an intake port 18, an exhaust port 20, and an intake valve 22 and exhaust valve 24 regulating the fluid communication between the cylinder 14 and the intake port 18 and the exhaust port 20, respectively. The intake port 18 receives air from an air intake manifold 26 to which intake air travels after passing through, for example, an air filter (not shown) and turbo charger (not shown). A gaseous fuel admission valve 28 of a type commonly known in the art is positioned between a gaseous fuel common rail 30 at an upstream side and the intake port 18 at a downstream side. A nozzle portion of the admission valve 28 may extend into the intake port 18 for delivering gaseous fuel thereto and mixing with the air from the air intake manifold 26.

The gaseous fuel common rail 30 may receive gaseous fuel from a gaseous fuel supply system 32. The gaseous fuel supply system 32 may provide any appropriate gaseous fuel that may be used in the multi fuel engine 12, such as LNG, methane, hexane, pentane or any other gaseous hydrocarbon fuel. The supply system 32 may include a gaseous fuel reservoir 34 that may contain the appropriate gaseous fuel, such as natural gas or other gaseous hydrocarbon fuel, that may be in liquid (e.g., LNG) or vapor (e.g., natural gas from a low-pressure gas source) form. An outlet port of the gaseous fuel reservoir 34 may be fluidly connected to a gaseous fuel pump 36 that draws the gaseous fuel in liquid or vapor form from the reservoir 34 and pumps the gaseous fuel across a vaporizer 38 where heat is added to convert the gaseous field to a vapor, such as compressed natural gas (CNG). The vaporizer 38 may be omitted where the gaseous fuel in the gaseous fuel reservoir 34 is already in vapor form.

In the illustrated embodiment, the gaseous fuel pump 36 may be a cryogenic pump that is driven by pressurized hydraulic fluid. The hydraulic fluid is provided by a hydraulic pump 40 that draws hydraulic fluid, such as pump oil, from a hydraulic fluid reservoir 42, and outputs the pressurized hydraulic fluid through a solenoid operated hydraulic fluid cut off valve 44 to the gaseous fuel pump 36. The hydraulic pump 40 may be a mechanical pump directly driven by of the engine 12 by selectively operatively coupling the hydraulic pump 40 to an output shaft of the engine 12 (not shown) via a clutch and belt (not shown) or other selective coupling mechanism. Alternatively, the hydraulic pump 40 may be an electric pump powered by batteries or a battery pack as discussed below that may be recharged via selective operative coupling to the output shaft of the engine 12 when necessary. In other implementations, variable displacement pumps may be substituted and be constantly interconnected, but with the capability to be set to zero displacement to stop flow. Still further, a bypass may be provided, with the hydraulic pump running constantly and fluid being circulated back to the hydraulic fluid reservoir 42 with only a minimum pressure rise when not needed for the cryogenic pump 36. Additional alternative pumps and pump arrangements for delivering the gaseous fuel from the gaseous fuel reservoir 34 to the gaseous fuel common rail 30 may be implemented, and are contemplated by the inventors as having use in engine systems 10 in accordance with the present invention.

The vaporized fuel exiting the vaporizer 38 is communicated to the gaseous fuel common rail 30 and ultimately to the admission valves 28 of the cylinders 14. Flow of the vaporized fuel may be controlled by a solenoid operated gas shut off valve 46 that may be shut off when the engine 12 is in a liquid fuel only mode, and open when the engine is in a gaseous fuel only or a mixed fuel mode. The gaseous fuel supply system 32 may further include a CNG accumulator 48 positioned between the gaseous fuel common rail 30 and the vaporizer 38 upstream from the gas shut off valve 46 for storage of CNG that is not yet delivered to the gaseous fuel common rail 30. The size and functioning of the CNG accumulator 48 is discussed in greater detail below. Although not shown, it is recognized that the gaseous fuel supply system 32 might typically include a balance regulator positioned between the gas shut off valve 46 and the gaseous fuel common rail 30 for regulating the gaseous fuel pressure at the upstream side of the gaseous fuel admission valve 28.

The engine 12 may further include a liquid fuel injector 50, such as an electronic unit injector, for injecting liquid fuel, such as diesel fuel, into the cylinder 14. The liquid fuel may be provided to the fuel injector 50 via a liquid fuel common rail 52 supplying each of the cylinders 14 of the engine 12 with pressurized liquid fuel transmitted to the common rail 52 from a liquid fuel supply system 54. Liquid fuel from a liquid fuel reservoir 56 may flow through a primary fuel filter 58 to a liquid fuel transfer pump 60. The transfer pump 60 receives the liquid fuel and then discharges the liquid fuel through a secondary fuel filter 62 to a high pressure (HP) fuel pump 64. The pressurized fuel from the HP fuel pump 64 is transmitted to the liquid fuel common rail 52. A solenoid operated liquid fuel shut off valve 66 may be positioned between HP fuel pump 64 and the liquid fuel common rail 52 to cut off the flow of liquid fuel if necessary. The exhaust port 20 fluidly connects the cylinder 14 to an emissions portion (not shown) of the multi fuel engine system 10 to discharge the exhaust created by the combustion of the fuels from the cylinder 14.

An electronic control module (ECM) 70 (FIG. 2) of the multi fuel engine system 10 may be connected to the various sensors and operating components of the system 10 to monitor and control the performance of the engine 12 and the fuel supply systems 32, 54. In the present system 10, the ECM 70 may be operatively connected to a temperature sensor 72 and a pressure sensor 74 for the gaseous fuel common rail 30, a temperature sensor 76 and a pressure sensor 78 of the liquid fuel common rail 52, a temperature sensor 80 and a pressure sensor 82 of the air intake manifold 26, a hydraulic pump pressure sensor 84, temperature sensors 86, 88 of the vaporizer 38 and the accumulator 48, respectively, pressure sensors 90, 92 of the fuel transfer pump 60 and the HP fuel pump 64, respectively, among other sensing devices. The various sensors are operatively connected to the ECM 70 and transmit control signals to the ECM 70 containing values indicative of the state of the parameters being measured. Such temperature and pressure sensors are well known in the art and therefore a detailed description of the sensors is not included herein. An engine speed sensor 94 associated with a camshaft or other component of the engine 12 from which the engine speed and torque or load on the engine 12 may be determined may also be operatively connected to the ECM 70 for delivering engine speed indicative signals thereto. The ECM 70 may also be operatively connected to the operational and controllable elements of the system 10, including the valves 28, 44, 46, 66, the fuel injector 50, and the pumps 40, 60, 64. In this regard, it is known to include driver circuitry or software within the ECM 70 for delivering control signals to the controlled elements to control the flow rates of the corresponding fuels there through and the delivery of the fuels to the cylinders 14. However, it is recognized that such driver circuitry could be implemented separate from, but connected to, the ECM 70.

The multi fuel engine system 10 as shown can operate in a liquid fuel mode or a multi fuel mode. In the liquid fuel mode, the gaseous fuel admission valve 28 remains closed while pressurized liquid fuel from the liquid fuel supply system 54 is injected into the engine cylinder 14 by the fuel injector 50 as the sole source of fuel energy during combustion. In the multi fuel mode, the gaseous fuel from the gaseous fuel supply system 32 is discharged into the intake port 18 by the gaseous fuel admission valve 28 and mixed with air from air intake manifold 26, and a small amount or pilot amount of the pressurized liquid fuel is injected into cylinder 14 at the fuel injector 50 in order to ignite the mixture of air and gaseous fuel. Those skilled in the art will understand that the configuration of the multi fuel engine system 10 shown in FIG. 1 and described herein is exemplary only, and other configurations are contemplated for implementation of the multi fuel engine control strategy in accordance with the present disclosure. For example, the multi fuel engine system 10 may be configured to be powered by additional types of gaseous and liquid fuels, and the multi fuel engine control strategy may be configured to allow specification of substitution ratios for apportioning the input power required by the engine 12 between the available fuels.

Figure 2:
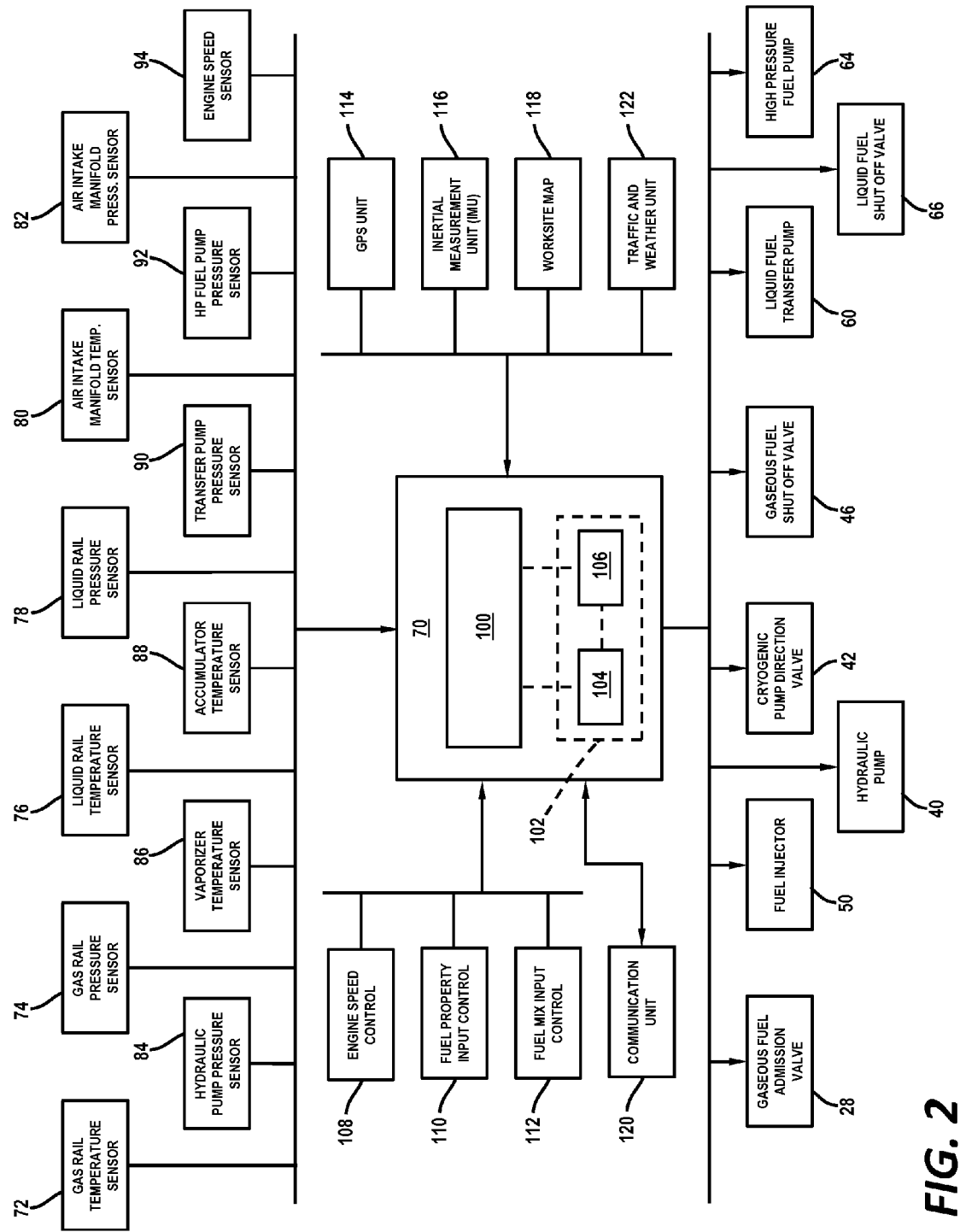
FIG. 2 is a schematic illustration of an exemplary electronic control unit and control components that may be implemented in the exemplary multi fuel engine system of FIG. 1.

FIG. 2 illustrates one exemplary configuration of the ECM 70 that may be implemented in the multi fuel engine system 10 to control the operation of the engine 12 and the apportionment of fuels to provide the required power to the engine 12, and, if desired, to control the operations of other systems that are integrated with the multi fuel engine system 10. The ECM 70 may include a microprocessor 100 for executing specified programs that control and monitor various functions associated with the system 10. The microprocessor 100 includes a memory 102, such as read only memory (ROM) 104, for storing a program or programs, and a random access memory (RAM) 106 which serves as a working memory area for use in executing the program(s) stored in the memory 102. Although the microprocessor 100 is shown, it is also possible and contemplated to use other electronic components such as a microcontroller, an ASIC (application specific integrated circuit) chip, or any other integrated circuit device.

The ECM 70 electrically connects to the control elements of the multi fuel engine system 10, as well as various input devices for commanding the operation of the engine 12 and monitoring its performance. As a result, the ECM 70 may be electrically connected to the temperature sensors 72, 76, 80, 86, 88, the pressure sensors 74, 78, 82, 84, 90, 92 and the engine speed sensor 94 as discussed above to receive parameter value indicative signals relating to the operating conditions of the system 10. The ECM 70 may also be electrically connected to input devices such as, for example, an engine speed control 108, a fuel property input control 110 and a fuel mix input control 112. An operator of the multi fuel engine system 10 may manipulate the controls 108, 110, 112 to generate and transmit control signals to the ECM 70 with commands for operating the engine 12 as desired to produce the necessary engine speed with a desired apportionment of the available fuels. The engine speed control 108 may be any type of input device allowing an operator to specify a speed at which the engine 12 should operate to provide the output necessary to perform a desired task. For example, the engine speed control 108 could be a gas pedal of a vehicle or excavating machine, a thrust lever of an airplane, or other appropriate input device for specifying the speed of the engine 12.

The fuel property input control 110 may be any appropriate input device allowing an operator, technician or other user of the multi fuel engine system 10 to input information regarding the properties of the fuels available for use by the system 10. The fuel property data input may include any data necessary for the system 10 to determine an amount of a fuel necessary for producing an amount of power in the engine 12 to produce the speed commanded by the engine speed control 108. Examples of fuel property data that may be specified for a fuel available to the engine 12 include the density or specific gravity of the fuel, the heat of combustion of the fuel expressed as, for example, a lower or higher heating value indicating the energy released by the fuel per unit of mass or volume, and the like. The fuel property input control 110 may be a computer terminal or other similar input device connected to the ECM 70 and allowing a user to input the fuel property data and transmit the data to the ECM 70. In alternative embodiments, the fuel property input control 110 may be a remote computing device or computing system connected via a network to transmit fuel property data to the multi fuel engine system 10 from a remote location, such as a central control center, managing the operation of the system 10 in conjunction with the ECM 70. As a further alternative, the fuel property input control 110 may be an external storage device, such as a magnetic, optical or solid state storage device, on which the fuel property data is stored and downloaded to the ECM 70 when the external storage device is connected thereto. Further alternative devices for inputting fuel property data and transferring the data to the ECM 70, which can be a direct connection or a wireless connection, will be apparent to those skilled in the art and are contemplated by the inventors as having use in multi fuel engine systems in accordance with the present disclosure.

The fuel mix input control 112 may be any appropriate input device allowing an operator, technician or other user of the multi fuel engine system 10 to input information regarding the fuel substitution strategy for the fuels available for use by the system 10. The fuel substitution strategy data input at the fuel mix input control 112 may specify fuel substitution ratios or fractions for usage of each of the available fuels for meeting the desired engine speed input power necessary to operate the engine 12 at the engine speed specified at the engine speed control 108. For example, in a dual fuel engine operating with a gaseous fuel (e.g., natural gas) and a liquid fuel (e.g., diesel fuel), it may be desired in a multi fuel mode to have the gaseous fuel provide 80% of the power requirement and have the liquid fuel provide the remaining 20% of the power requirement. In such a case, a substitution ratio of 20%, or 0.20, may be input at the fuel mix input control 112 and stored at the ECM 70 so that the liquid fuel will be substituted for the gaseous fuel and provide 20% of the power. The fuel substitution strategy data may also include adjustments to the fuel substitution ratio to be made in response to transient events so that, for example, more liquid fuel is added when the engine load increases, and more gaseous fuel is added when the engine load decreases. Where more fuels are available, a fuel substitution ratio or fraction may be input for each fuel, with the individual substitution ratios totaling 100%, or 1.00, so that the power supplied by the individual fuels adds up to the total input power required for the engine 12. The fuel mix input control 112 may be a similar input device as those discussed above for the fuel property input control 110. In some embodiments, the input controls 110, 112 may be implemented in the same input device, such as a graphical user interface located within an operator station and having a series of screens allowing an operator to input the fuel property data and the fuel mix data.

The fuel substitution ratio may be determined by the manufacturer or the customer to establish a desired balance between the level of performance required of the machine and the fuel economy realized by the efficient substitution of the cheaper fuel (typically the gaseous fuel) for the more expensive fuel (typically the liquid fuel). For example, a substitution ratio of 60% natural gas and 40% diesel fuel may perform well in the field, while a substitution ratio of 80% natural gas and 20% diesel fuel may still accomplish the required tasks but at a lower total fuel cost. To allow flexibility in the operation and control of the machine, the fuel mix input control 112 may be configure to allow an operator to input multiple alternative fuel substitution strategies that may be stored in the memory 102. With this capability, the machine may be programmed with a performance mode fuel substitution strategy intended to optimize the performance of the machine and an economy mode fuel substitution strategy that optimizes the cost of operating the machine, as well as additional operating modes. The input control 112 may further be configured to allow an operator to select which of the available fuel substitution modes to execute and to store the selection in the memory 102.

In the engine system in accordance with the present disclosure, additional components are provided to further assist the ECM 70 in controlling the engine system 10 and in identifying opportunities for converting and storing energy from the engine 12 for later use when high load demands are placed on the engine 12. During operation of the machine in which the engine system 10 is implemented, the engine 12 experiences periods of heavy loading, such as when hauling a load, driving uphill and operating an implement to perform work. The engine 12 also experiences periods of minimal loading, or having its shaft turned by other drive elements, such as when coasting or braking, or when traveling downhill. These latter periods provide an opportunity to accumulate and store energy for later use, particularly within the gaseous fuel supply system 32, when the low or no load periods can be identified by the ECM 70. For this purpose, the system 10 may include a global positioning system (GPS) unit 114 operatively connected to the ECM 70 to provide signals indicating the position of the machine when the machine is in an open work area. Depending on the speed of the machine, the GPS unit 114 may also derive the direction and speed of movement of the machine with reasonable accuracy and communicate the information to the ECM 70.

As an alternative or as a supplement to the GPS unit 114, the system 10 may be provided with an inertial measurement unit (IMU) 116 operatively connected to the ECM 70 and transmitting signals to the ECM 70 indicating the velocity, orientation and gravitational forces acting on the machine, as well as a location of the machine determined by dead reckoning. The IMU 116 allows the position of the machine to be determined when GPS signals are unavailable, such as in mines, tunnels, buildings or other enclosed work spaces. In other environments, the information from the GPS unit 114 and the IMU 116 may be used together to give a complete indication of the position and travel of the machine. The information from the IMU 116 can be used to determine whether the machine is moving uphill and placing a greater load on the engine 12, or moving downhill with a lesser load on the engine 12, among other characteristics of the machine's movement.

As a further supplement, the system 10 may include a work site map 118 either as a separate module operatively connected to the ECM 70, or as a file loaded into and stored in the memory 102. Alternatively, the work site map 118 may be stored at a remote location, such as a control room, and accessed by the ECM 70 as necessary via a communication unit 120 of the engine system 10 to retrieve the work site map. The work site map 118 includes the geographic layout of the work site including routes through the work site between various workstations over which the machine may travel, such as between a loading station and a dumping station for a dump truck. The work site map 118 may further include supplemental information such as topographical information indicative of the grade of the terrain, speed limits along the work routes and other information that can be used in calculating a total payload for the machine and a load being applied to the engine 12. The engine system 10 may store an operation schedule and/or truck assignments for the machine performing work at the worksite that can also be used by the ECM 70 to predict transient events for the machine in advance of the occurrence of the events. The truck operation schedule and assignments may be provided in the work site map 118, in a separate unit operatively connected to the ECM 70, or as a file stored in the memory 102.

The ECM 70 and the worksite map 118 may be configured to adapt in situations where a worksite map may not be input by the manufacturer or customer, or when the actual routes taken by the machine while operating at the worksite diverge from the routes stored in the worksite map 118. As the machine traverses a route that is not found in the worksite map 118, the ECM 70 may begin to store and evaluate data from the GPS unit 114 and the IMU 116 regarding the machine's coordinates, direction of travel, speed of travel, and the like, as well as information regarding the operating conditions of the machine, such as the engine speed, the payload, if any, being hauled, and other information that may be relevant to determining when transient events may occur along the new work route. The ECM 70 may then cause the information to be stored in the worksite map 118 in a similar manner as the information for a downloaded or otherwise installed worksite map. The new route information may then be used in the advanced determination of the occurrence of transient events as discussed below. In some implementations, the ECM 70 may temporarily store the information for the divergent route without updating the worksite map 118, and wait until it detects additional instances of the machine traversing the divergent route before updating the worksite map 118 so that the worksite map 118 is not updated each time the machine strays from a planned route due to a one-time aberrant event.

The information provided by the GPS unit 114, the IMU 116 and the worksite map 118 may allow the ECM 70 to predict the occurrence of transient events under normal operating conditions according to the operation schedule. However, real time factors may affect whether the predicted transient events actually occur. Weather and traffic conditions at the worksite may reduce the speed of the machines and, correspondingly, the loads on the engines, that are anticipated based on the worksite routes and speed limits provided in the worksite map 118. To further assist in the accuracy in predicting the actual occurrence of the transient events, the engine system 10 may include a traffic and weather unit 122 that provides the ECM 70 with current information on the conditions at the worksite. The traffic and weather unit 122 may utilize the communication unit 120 to access remote information sources, such as a central control center of the operator of the worksite, or third party sources such as The Weather Channel and Traffic.com. In some implementations, the traffic and weather unit 122 may be integrated into the GPS unit 113, which may be provided with navigation functionality that responds to current traffic conditions.

The ECM 70 may also be electrically connected to actuators and transmit control signals to the actuators to cause the various elements of the multi fuel engine system 10 to operate. Consequently, actuators for fluid flow control devices such as the valves 28, 44, 46, 66, the liquid fuel injector 50 and the pumps 40, 60, 64 may be connected to the ECM 70 and receive control signals from the ECM 70 to operate the corresponding valves 28, 44, 46, 66, the fuel injector 50 and the pumps 40, 60, 64 to control flow of the gaseous and liquid fuels. Alternate implementations of the system 10 may allow the engine 12 to be powered by additional fuels that may be available. In those implementations, additional control valves and shut off valves may be provided to control the flow of the additional fuels used in the system 10.

Transient events occur in a variety of situations that are encountered by the machine during operation at the worksite. For example, transient events occur where the machine accelerates (engine speed increase) or decelerates (engine speed decrease), and where the grade of the operating surface over which the machine is traveling increases or decreases such that the load on the engine 12 changes. Transient events also occur when a gear shift is executed in the transmission. When an up shift occurs to a higher gear, the load on the engine 12 increases as the gear ratio decreases. The opposite occurs during a downshift. The machine is configured with a shift control logic (SCL) strategy for executing the gear shifts in a manner that optimizes the machine's performance.

Figure 3:
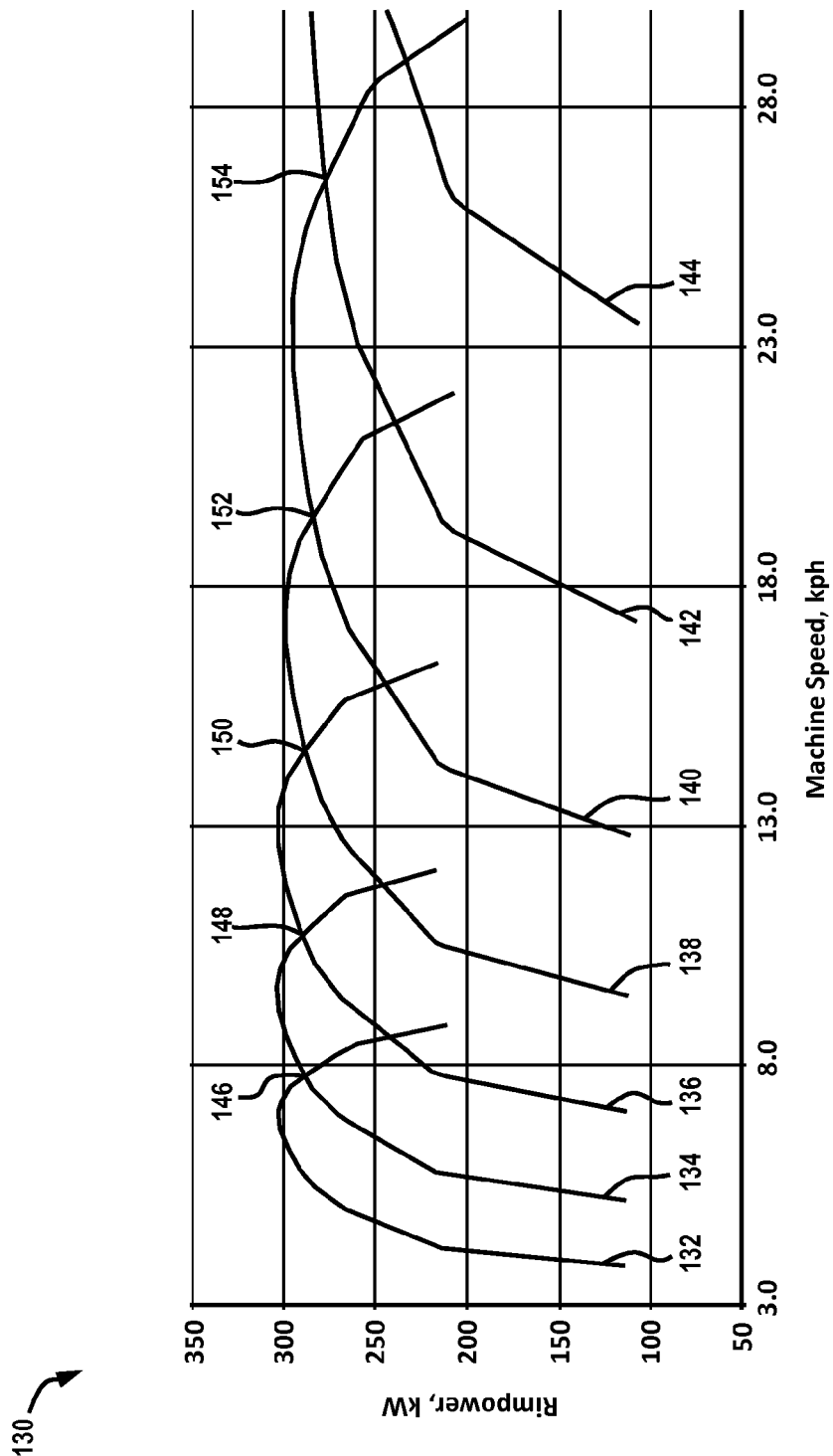
FIG. 3 is a chart of machine speed versus rimpower including curves for available transmission gears for use in a shift control logic strategy that may be implemented in the multi fuel engine system of FIG. 1.
Figure 4:
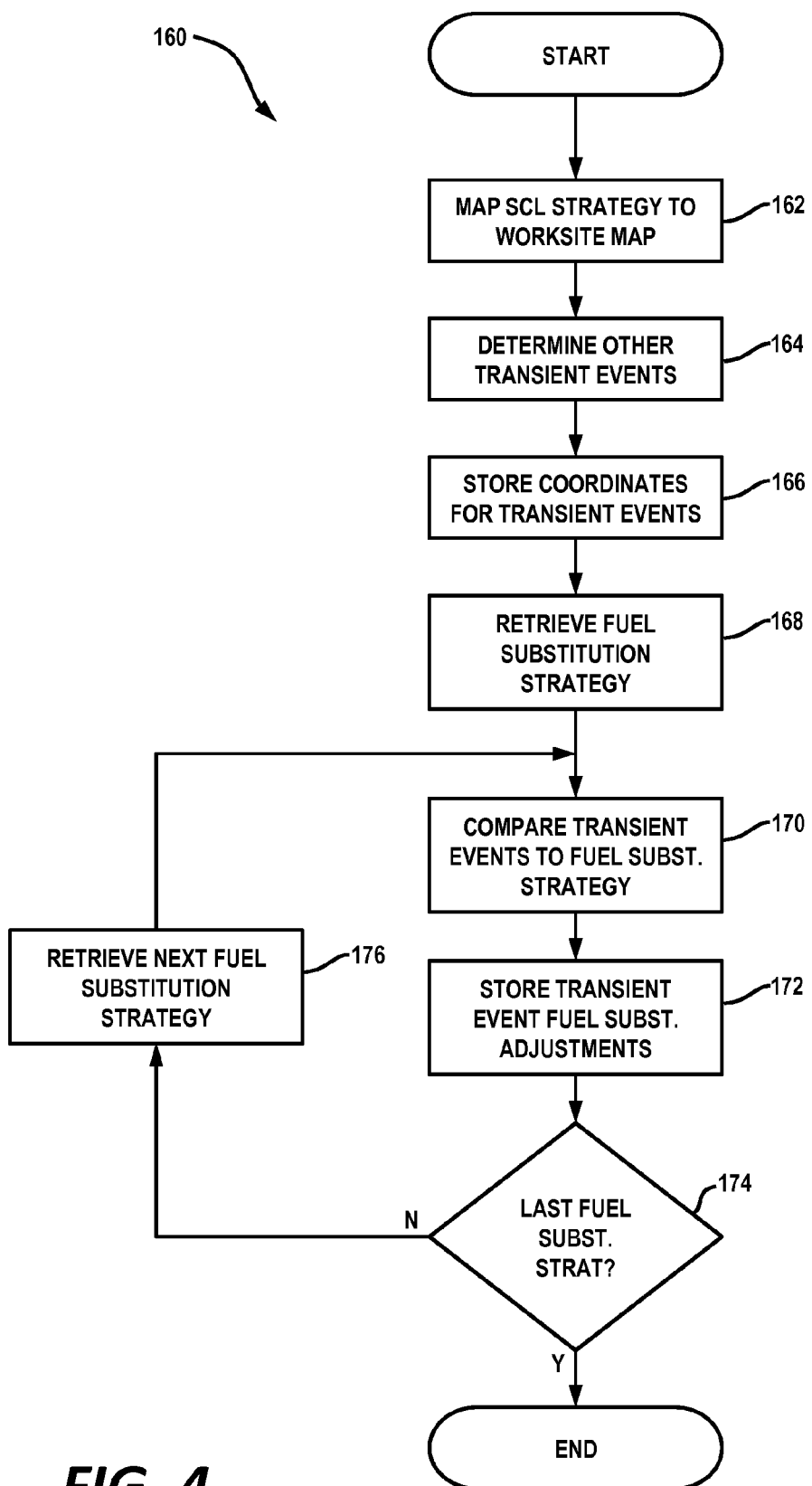
FIG. 4 is a flowchart of an exemplary transient event mapping routine that may be implemented in the multi fuel engine system of FIG. 1.
Figure 5:
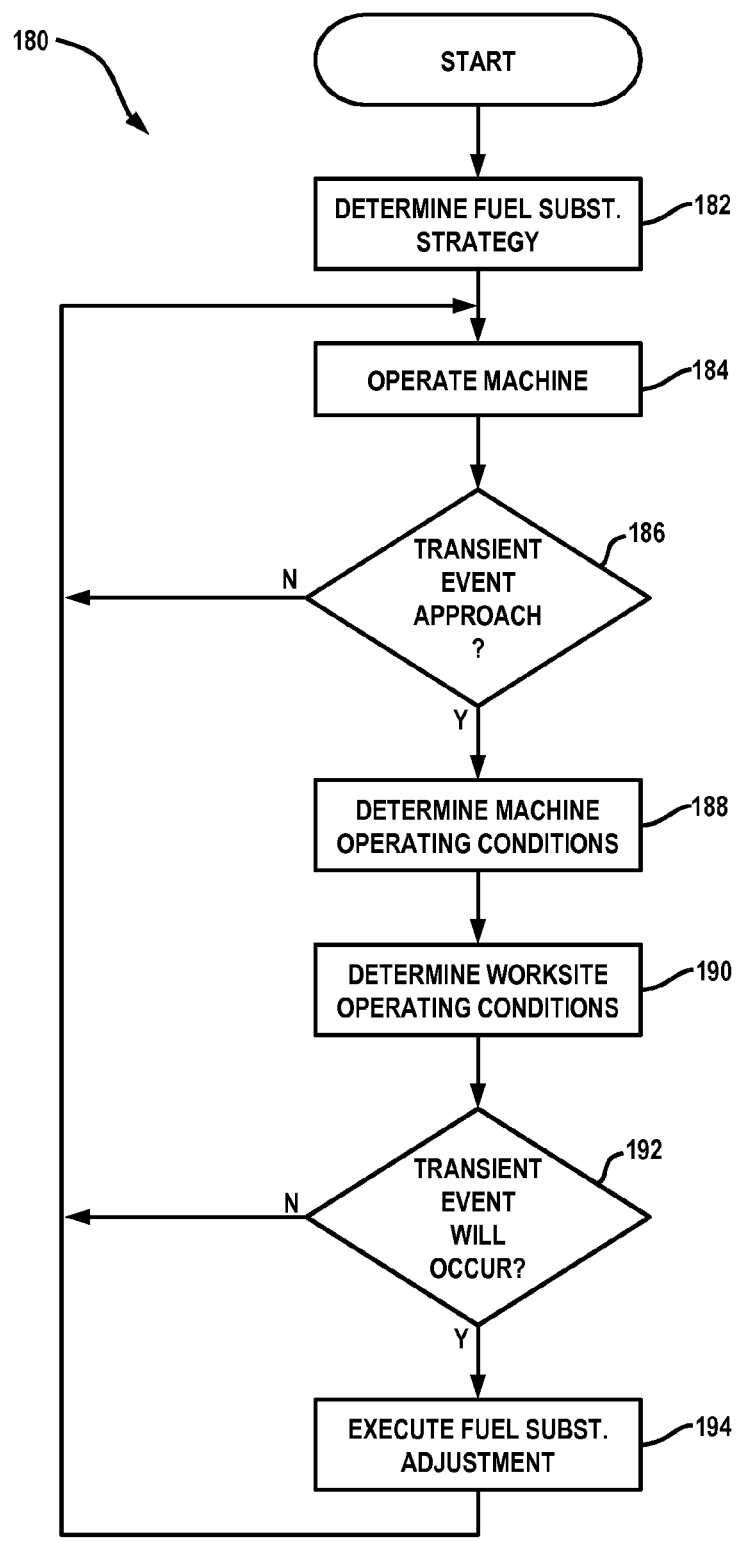
FIG. 5 is a flowchart of an exemplary machine operation routine that may be implemented in the multi fuel engine system of FIG. 1.

FIG. 3 provides a chart 130 of the machine speed versus the rimpower transmitted to the wheels or other traction devices of the machine for each of the gears. In the exemplary chart 130, curves are provided for each gear so that a curve 132 represents first gear, a curve 134 represents second gear, a curve 136 represents third gear, a curve 138 represents fourth gear, a curve 140 represents fifth gear, a curve 142 represents sixth gear, and a curve 144 represents seventh gear. In one SCL strategy, performance of the transmission may be maximized by maximizing the area under the curves 132-144 at which the machine operates. The area may be maximized by executing the gear shifts at the points where one gear intersects the curve for the next gear. Consequently, the shift from first gear to second gear may occur at a shift point 146 where the first gear curve 132 intersects the second gear curve 134 at approximately 7.8 kph and 287 kW. Shifts may similarly occur at shift points 148, 150, 152, 154, and downshifts may also occur at the same shift points 146-154 as the machine speed decreases. Variations of this SCL strategy may be implemented for a particular machine to achieved desired machine performance, such as shifting at machine speeds slightly greater than dictated by the shift points 146-154, downshifting at lower machine speeds than those at which the up shift between the same gears occurs, and factoring in other conditions such as the payload being transported by the machine. Regardless of the actual SCL strategy employed in the machine, particularly relevant to the present disclosure is the ability to determine when a gear shift and the corresponding transient event may occur based on the machine's operating conditions such as machine speed and rimpower required as discussed below.

INDUSTRIAL APPLICABILITY

With the information available at the machine, many of the transient events that may occur during operation of the machine can be anticipated, and adjustments can be made to the fuel substitution strategy before the transient events actually occur. The performance of the machine thus can be optimized to prevent issues such as gear hunting during shifts and engine knocking occurring when the input of gaseous fuel outpaces the increased supply of intake air. Where the machine begins operating at the worksite, the transient event mapping routine 160 may execute to determine where transient events may occur and whether adjustments to the fuel substitution strategy may be necessary. The mapping routine 160 may be executed as part of the machine setup procedure before the machine is delivered to the customer, by the customer after receipt and when the information for the work site map is known, or at each startup of the machine so that the most up to date work site map and fuel substitution strategy information may be used. Additionally, the mapping routine 160 may be re-executed whenever changes to the work site map or the fuel substitution strategy are input to the engine system 10.

The mapping routine 160 may begin at a block 162 where the ECM 70 or other appropriate processor may map the SCL strategy for executing gear shifts to the work site map 118 and, if available, the operation schedule. The processor may be configured to determine where gear shifting will occur on the worksite map 118 based on various factors and assumptions. Where the SCL strategy is based on a speed versus rimpower chart such as the chart 130 discussed above, the processor may be able to determine if the machine is at or near one of shift points 146-154 by estimate the speed of the machine the rimpower required to move the payload at rated speed. The machine speed may be estimated using the information on the speed limits for the work site or the particular route being traveled, estimates of the rate of acceleration of the machine, the grade of and the direction of travel over the operating surface, and estimates of the total payload (greater when hauling material less after dumping material), and any other available relevant information. The estimated speed may then be used, along with the payload, grade and other factors, to determine the rimpower necessary to move the payload at the estimated machine speed. Once estimated, the machine speed and rimpower are compared to the chart 130 and, more specifically, to the values at the shift points 146-154 to determine whether a gear shift is likely to occur. If a gear shift is likely occurring or approaching at that worksite location, the location may be flagged as a transient event location and the estimated operating conditions of the machine may be noted, and the mapping of the worksite continues until all parts of the worksite over which the machine may travel are mapped.

It should be noted that alternate SCL strategies based on other parameters may be implemented in the machine. For example, gear curves may be plotted on a chart of the machine speed versus the fuel consumption, and the ECM 70 may determine the fuel consumption at the machine speed based on similar factors such as the machine speed, payload and surface grade, as well as factors such as a parameter indicating the chemical energy content or fuel quality of the fuels used in the multi fuel engine system 10. The SCL strategy discussed in general terms herein is merely exemplary, and the implementation of other SCL strategies in the machine and in the mapping routine 160 will be within the capabilities of those skilled in the art and is contemplated by the inventors as having use in multi fuel engine systems 10 in accordance with the present disclosure.

After determining the gear shift transient events at the block 162, or concurrently therewith, control may pass to a block 164 to evaluate the worksite map 118 to determine whether any non-gear shift transient events may occur as the machine is operating. Such transient events can occur at grade changes, speed changes and other events where the load on or the speed of the engine 12 changes. As with the gear shifts, the transient event location and machine operating conditions are noted. After the transient event locations are determined at the blocks 162, 164, control may pass to a block 166 where the transient event locations and operating conditions are stored in the memory 102 or other appropriate location.

After storage of the transient events, control passes to a block and fuel substitution strategy from the memory 102 for use in determining whether the transient events require adjustments to the fuel substitution strategy to avoid performance issues. As discussed above, the machine may be configured with multiple fuel substitution strategies that may alternately be selected based on a desired performance of the machine. After a first of the fuel substitution strategies, or the only fuel substitution strategy, is retrieved at the block 168, control may pass to a block 170 for each of transient events identified in the blocks 162, 164 is evaluated against the fuel substitution strategy to determine if an adjustment of the fuel substitution ratio will be necessary. The operating conditions associated with the transient event may be used to determine the properties of the fuel mixture required to provide the necessary power during the transient event. The fuel properties for the transient event may then be compared to the fuel properties dictated by the fuel substitution strategy. For some transient events, the normal fuel substitution ratio may be sufficient to meet the requirements for the transient event. For example, gear shifts occurring when the machine is unloaded and traveling over level ground or on a downgrade may be handled adequately by the planned fuel substitution ratio, and no adjustments are required. For other transient events, the planned fuel substitution ratio may be inadequate and result in performance issues if not adjusted. When a gear up-shift occurs and the machine is carrying a load, the gear shift may hunt if the planned fuel substitution ratio does not provide adequate power to shift to the higher gear. When more fuel is required to accelerate the machine or travel up a grade, the air intake response may lag behind the response of the admission valve 28, which can result in engine knocking and even stalling of the engine 12 due to inadequate power. In such cases, the ECM 70 may determine that the fuel substitution ratio should be adjusted to provide a fuel mixture that is richer in the liquid fuel to provide the additional power requirement. In the same way, the ECM 70 may determine that less power is required for the machine, such as during a gear shift when the machine is traveling downgrade, and that the fuel substitution ratio should be adjusted to decrease the amount of liquid fuel in the mixture, and thereby reduce the overall fuel cost of operating the machine. After determining the transient events that require fuel substitution strategy adjustments, control may pass to a block 172 where the ECM 70 stores the transient event fuel substitution adjustments.

With the transient event fuel substitution adjustments for the first substitution strategy stored, control may pass to a block 174 to determine whether all available fuel substitution strategies have been compared to the transient events. If not all fuel substitution strategies have been evaluated, control may pass to a block 176 where the ECM 70 retrieves the next fuel substitution strategy for evaluation and then passes control back to the blocks 170, 172 to compare the next fuel substitution strategy to the transient events stored in memory and store any necessary transient event fuel substitution adjustments. If the last or only fuel substitution strategy has been evaluated, at the block 174, the transient event mapping routine 160 may terminate.

With the fuel substitution strategy/strategies loaded and the transient event fuel substitution adjustments stored, the machine may operate at the worksite under the control of the fuel substitution strategy with adjustments being made as necessary to optimize the performance of the machine in the multi fuel engine system 10. The machine may be configured with a machine operation routine 180 that may begin execution upon startup of the machine at the worksite. The machine operation routine 180 may begin at a block 182 where the ECM 70 determines fuel substitution strategy to use to control the mixture of the available fuels to provide power to the machine. As discussed above, the machine may be programmed with multiple alternative fuel substitution strategies that may include, for example, a performance strategy that ensure sufficient power and responsiveness are provided to the engine 12 by the fuel mixture, and an economic strategy that may sacrifice some power and responsiveness by using mixtures that are richer in gaseous fuels that reduce the cost of operating the machine. With multiple fuel substitution strategies available, an operator may be able to input selection of the desired strategy the fuel mix input control 112, and the ECM 70 may use the input selection to determine the appropriate fuel substitution strategy at the block 182.

After the fuel substitution strategy is determined, control may pass to a block 184 where the machine operates at the worksite with fuel being provided to the engine 12 with fuel substitution ratios according to the fuel substitution strategy. As the machine operates, control may pass to a block 186 where the ECM 70 evaluates whether the machine is approaching the location of an anticipated transient event as determined by the mapping routine 160. The ECM 70 may compare coordinates indicating the machine's current location provided by the GPS unit 114 or the IMU 116 to the coordinates for the transient events store at the block 166 of the routine 160. If the machine is not located at or approaching the location of one of the stored transient events, the ECM 70 will not check for transient event fuel substitution adjustments, and control may pass back to the block 184 to continue the normal operation of the machine.

If the ECM 70 determines that the machine is at or is approaching a transient event location at the block 186, control may pass to a block 188 where the ECM 70 determines the current machine operating conditions. Such operating conditions may include the machine's current speed, acceleration and direction based on the information from the GPS unit 114 and IMU 116, the fuel mixture being supplied to the engine 12 as dictated by the fuel substitution strategy, the load based on the engine speed measured by the engine speed sensor 94, and the grade of the operating surface at the location as provided by the IMU 116 or the worksite map 118. The current machine operating conditions may provide an indication as to whether the machine will in fact experience a transient event at the anticipated location. If the machine is travelling slower than the speed limit for the route or travelling without a load where the operating schedule expects the machine to be hauling a load, the machine may not execute an anticipated gear shift at the stored transient event location. For this reason, the current machine operating conditions are determined and evaluated.

After determining the current machine operating conditions at the block 188, control may pass to a block 190 where the current operating conditions at the worksite are determined. The ECM 70 may access information provided by the traffic and weather unit 122 to determine the conditions on the ground at the worksite. Under normal worksite conditions, i.e., machines travelling at the posted speed limits without hindrance due to weather conditions, the transient events will be expected to occur as anticipated during the mapping routine 160. At times, however, the worksite conditions may prevent an anticipated transient event from occurring. Where traffic is moving slower than the specified speed limit due to unanticipated queuing and bunching, the machine will sit idling at times and shift gears at unexpected locations, if at all. Inclement weather may similarly dictate slower machine speeds that may be handled by an economic fuel mixture.

With the current machine operating conditions and current worksite operating conditions determined at the blocks 188, 190, respectively, control may pass to a block 192 where the ECM 70 evaluates the operating conditions and the transient event fuel substitution adjustments, if any, for the location to determine whether the transient event will occur and require a fuel substitution adjustment. If the current conditions indicate that the transient event will not occur as predicted during the mapping routine 160, fuel substitution adjustments will not be required at that location and control may pass back to the block 184 to continue operating the machine and determining when the next anticipated transient event is approaching.

If the machine is operating as expected and the traffic and weather are not impeding the operation of the machine at the worksite, the transient event should occur as expected. In this case, control may pass from the block 192 to a block 194 for execution of the fuel substitution adjustment for the transient event if any was determined in the mapping routine 160. If an adjustment is necessary, the ECM 70 will cause the engine system 10 to alter the mixture of the liquid and gaseous fuels provided to the engine cylinders 14 per the calculated adjustment. The adjusted fuel mixture may continue to be provided to the engine 12 for the duration of the transient event, after which the fuel mixture may return to that dictated by the fuel substitution strategy until the machine approaches the next transient event location. After the fuel mixture adjustment is executed, control may pass back to the block 184 to resume normal machine operations as the machine proceeds to the next transient event location.

The routines 160, 180 illustrated and described herein provide one exemplary implementation of multi fuel engine substitution optimization for transient event performance as the machine operates at the worksite. The various processes set forth herein may be modified, but the basic optimization strategy of mapping the SCL strategy and other transient events to the worksite map, determining any necessary adjustments to the fuel substitution strategy that may be necessary as the transient events are encountered, and executing the fuel substitution adjustments when the machine arrives at the transient event locations will be present in multi fuel engine systems 10 in accordance with the present disclosure.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A method for mapping transient events for a machine operating at a worksite, comprising:
   determining at an electronic control module associated with the machine a transmission gear shift schedule for the machine based on a shift control logic strategy for the machine and worksite map information for the worksite in which the machine will operate;
   storing gear shift transient event coordinates for gear shift transient events identified in the transmission gear shift schedule in a memory associated with the machine;
   retrieving from the memory a first fuel substitution strategy for providing a mixture of available fuels to a multi fuel engine of the machine;
   comparing the gear shift transient events to the first fuel substitution strategy;
   for each gear shift transient event, determining whether a gear shift fuel substitution adjustment to the first fuel substitution strategy is required based on the comparison of the gear shift transient event to the first fuel substitution strategy;
storing the fuel substitution adjustments in the memory;
operating the machine at the worksite under control of the electronic control module according to the first fuel substitution strategy;
determining at the electronic control module whether the machine is approaching the gear shift transient event coordinates for one of the gear shift transient events;
determining at the electronic control module whether the one of the gear shift transient events will occur when the machine arrives at the gear shift transient event coordinates for one of the gear shift transient events based on current machine operating conditions; and
executing the gear shift fuel substitution adjustment corresponding to the one of the gear shift transient events when the machine arrives at the gear shift transient event coordinates for the one of the gear shift transient events in response to determining that the one of the gear shift transient events will occur.

2. The method for mapping transient events of claim 1, comprising:
determining at the electronic control module non-gear shift transient events that may occur at the worksite based on the worksite map information; and
storing non-gear shift transient event coordinates for non-gear shift transient events identified from the worksite map information.

3. The method for mapping transient events of claim 2, comprising:
comparing the non-gear shift transient events to the first fuel substitution strategy;
for each non-gear shift transient event, determining whether a non-gear shift fuel substitution adjustment to the first fuel substitution strategy is required based on the comparison of the non-gear shift transient event to the first fuel substitution strategy; and
storing the non-gear shift fuel substitution adjustments in the memory.

4. The method for mapping transient events of claim 3, wherein the non-gear shift transient events comprise machine speed changes.

5. The method for mapping transient events of claim 3, wherein the non-gear shift transient events comprise grade changes to an operating surface of the worksite over which the machine is traveling.

6. The method for mapping transient events of claim 1, comprising:
determining whether the first fuel substitution strategy is a last fuel substitution strategy stored in the memory; and
retrieving a second fuel substitution strategy from the memory in response to determining that the first fuel substitution strategy is not the last fuel substitution strategy.

7. The method for mapping transient events of claim 1, wherein the worksite map information includes at least one of machine speed limits, machine travel routes through the worksite, and topographical information for the worksite.

8. A multi fuel engine system for a machine; comprising:
a multi fuel engine;
an engine speed control configured to output an engine speed control signal indicating a desired engine speed for the machine;
a plurality of actuators, wherein each of the plurality of actuators corresponds to a fluid flow control device for one of a plurality of fuels that are available for providing power to the multi fuel engine by causing a flow of the corresponding one of the plurality of fuels to the multi fuel engine;
a memory associated with the machine; and
an electronic control module operatively connected to the engine speed control, the plurality of actuators and the memory, wherein:
the electronic control module is configured to determine a transmission gear shift schedule for the machine based on a shift control logic strategy for the machine and worksite map information for a worksite in which the machine will operate stored in the memory,
the electronic control module is configured to store in the memory gear shift transient event coordinates for gear shift transient events identified in the transmission gear shift schedule,
the electronic control module is configured to retrieve from the memory a first fuel substitution strategy for providing a mixture of available fuels to the multi fuel engine via the fluid flow control devices,
the electronic control module is configured to compare the gear shift transient events to the first fuel substitution strategy,
the electronic control module is configured to determine, for each gear shift transient event, whether a gear shift fuel substitution adjustment to the first fuel substitution strategy is required based on the comparison of the gear shift transient event to the first fuel substitution strategy, and
the electronic control module is configured to store the fuel substitution adjustments in the memory,
the electronic control module is configured to operate the machine at the worksite according to the first fuel substitution strategy,
the electronic control module is configured to determine whether the machine is approaching the gear shift transient event coordinates of one of the gear shift transient events,
the electronic control module is configured to determine whether the one of the gear shift transient events will occur when the machine arrives at the gear shift transient event coordinates of the one of the gear shift transient events based on current machine operating conditions, and
the electronic control module is configured to execute the gear shift fuel substitution adjustment corresponding to the one of the gear shift transient events when the machine arrives at the gear shift transient event coordinates of the one of the gear shift transient events in response to determining that the one of the gear shift transient events will occur.

9. The multi fuel engine system of claim 8, wherein the electronic control module is configured to determine non-gear shift transient events that may occur at the worksite based on the worksite map information, and to store in the memory non-gear shift transient event coordinates for the non-gear shift transient events identified from the worksite map information.

10. The multi fuel engine system of claim 9, wherein the electronic control module is configured to compare the non-gear shift transient events to the first fuel substitution strategy, to determine, for each non-gear shift transient event, whether a non-gear shift fuel substitution adjustment to the first fuel substitution strategy is required based on the comparison of the non-gear shift transient event to the first fuel substitution strategy, and to store the non-gear shift fuel substitution adjustments in the memory.

11. The multi fuel engine system of claim 10, wherein the non-gear shift transient events comprise machine speed changes.

12. The multi fuel engine system of claim 10, wherein the non-gear shift transient events comprise grade changes to an operating surface of the worksite over which the machine is traveling.

13. The multi fuel engine system of claim 8, wherein the electronic control module is configured to determine whether the first fuel substitution strategy is a last fuel substitution strategy stored in the memory, and to retrieve a second fuel substitution strategy from the memory in response to determining that the first fuel substitution strategy is not the last fuel substitution strategy.

14. The multi fuel engine system of claim 8, wherein the worksite map information includes at least one of machine speed limits, machine travel routes through the worksite, and topographical information for the worksite.

15. A method for operating a machine having a multi fuel engine at a worksite, comprising:
    operating the machine at the worksite under control of a electronic control module associated with the machine and according to a fuel substitution strategy stored in a memory associated with the machine for providing a plurality of available fuels to the multi fuel engine of the machine;
    determining at the electronic control module whether the machine is approaching a location of an anticipated transient event;
    determining at the electronic control module current machine operating conditions in response to determining that the machine is approaching the location of the anticipated transient event;
    determining at the electronic control module whether the anticipated transient event will occur when the machine arrives at the location of the anticipated transient event based on the current machine operating conditions; and
    executing a fuel substitution adjustment to the fuel substitution strategy when the machine arrives at the location of the anticipated transient event in response to determining that the anticipated transient event will occur.

16. The method for operating the machine of claim 15, comprising operating the machine according to the fuel substitution strategy in response to determining that the machine is not approaching the anticipated transient event.

17. The method for operating the machine of claim 15, comprising:
    determining at the electronic control module current worksite operating conditions in response to determine that the machine is approaching the anticipated transient event;
    determining at the electronic control module whether the anticipated transient event will occur based on the current machine operating conditions and the current worksite operating conditions; and
    executing the fuel substitution adjustment to the fuel substitution strategy in response to determining that the anticipated transient event will occur.

18. The method for operating the machine of claim 17, wherein determining the current worksite operating conditions comprises determining the existence of weather conditions affecting machine speeds at the worksite.

19. The method for operating the machine of claim 17, wherein determining the current worksite operating conditions comprises determining the existence of traffic affecting machine speeds at the worksite.

20. The method for operating the machine of claim 15, comprising operating the machine according to the fuel substitution strategy in response to determining that the anticipated transient event will not occur.

* * * * *